No. 827,731. PATENTED AUG. 7, 1906.
M. AN HAACK & A. KNOBLAUCH.
LUBRICATING SPINDLE BEARINGS.
APPLICATION FILED SEPT. 8, 1905.
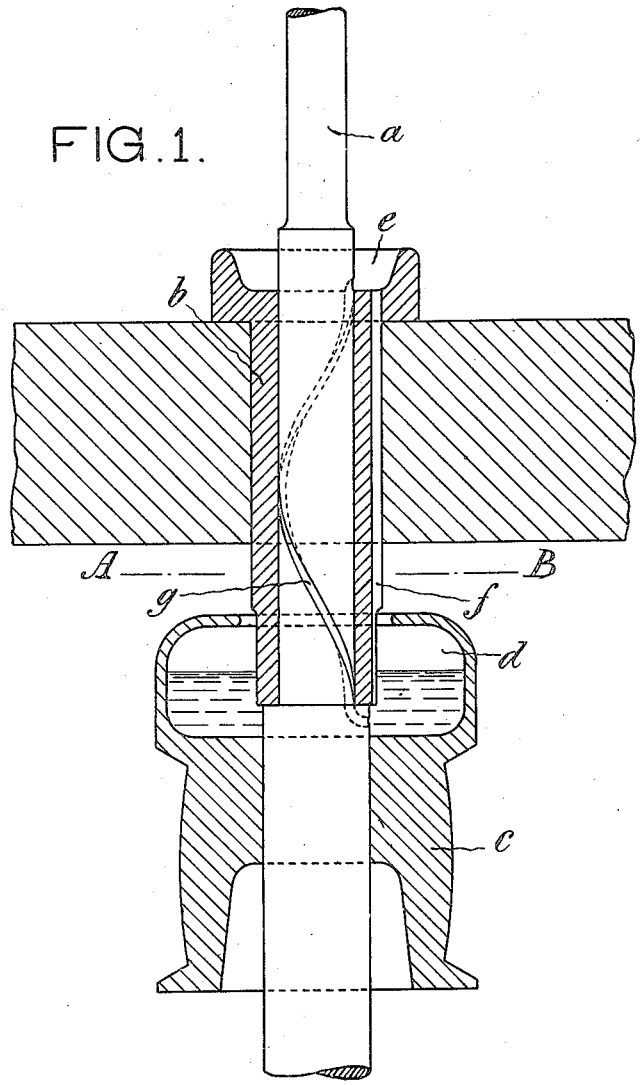
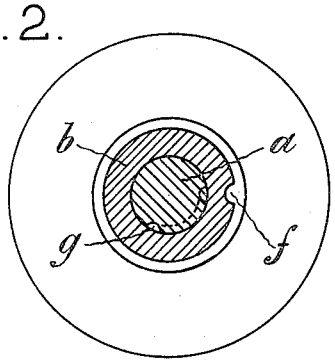
WITNESSES:
John G. Percival.
Edw. J. McNamara.
INVENTORS
Max An Haack
Albert Knoblauch
BY Richards
ATTORNEYS.

UNITED STATES PATENT OFFICE.

MAX AN HAACK AND ALBERT KNOBLAUCH, OF ZYRARDOW, RUDA GUZOWSKA STATION, NEAR WARSAW, RUSSIA.

LUBRICATING SPINDLE-BEARINGS.

No. 827,731.     Specification of Letters Patent.     Patented Aug. 7, 1906.

Application filed September 8, 1905. Serial No. 277,620.

*To all whom it may concern:*

Be it known that we, MAX AN HAACK and ALBERT KNOBLAUCH, subjects of the German Emperor, residing at Zyrardow, Ruda Guzowska Station, near Warsaw, in the Empire of Russia, have invented new and useful Improvements in Apparatus for Lubricating Spindle-Bearings, of which the following is a specification.

Our invention relates to apparatus designed for lubricating the bearings of quick-running spindles by the circulation of oil and in which the oil during the rotation of the spindle is conveyed from a reservoir arranged below the bearing back to the cup above the same through a helical groove ascending in the direction of rotation.

In apparatus of the kind heretofore employed either the oil-reservoir or the helical groove is stationary. In both cases the passage of the oil through the helical groove takes place at such a speed that the finely-divided heavy impurities contained in the oil cannot separate therefrom in the reservoir, and are therefore continually carried through the bearing.

According to our said invention this drawback is obviated by providing the helical groove and also the oil-reservoir upon the spindle, so as to rotate therewith. The oil in the reservoir by reason of its inertia revolves more slowly than the helical groove in the spindle. Thus the conveyance is caused only by the difference between the speeds of revolution of the oil and of the helical groove, the speed being consequently much less than heretofore, yet quite sufficient for renewing the oil in the bearing. The oil remains for some time in the reservoir, so as to allow the impurities to separate and to be forced by centrifugal action against the outer wall or sides of such reservoir out of the reach of the helical groove, so that they cannot be conveyed to the bearing, to which only the pure oil in contact with the spindle is conveyed through the helical groove.

In the accompanying drawings, Figure 1 is a vertical section, and Fig. 2 a transverse section on the line A B of Fig. 1.

Upon the spindle $a$ is arranged in the well-known manner below the bearing $b$, either separately or integrally with the pulley $c$, the oil-reservoir $d$, this reservoir being secured to the spindle. The oil flows from the cup $e$ at the top of the bearing $b$ through a channel forming a groove $f$ in the bearing down into the reservoir. In the rotation of the spindle the oil is lifted through the helical groove $g$, which ascends in the direction of rotation of the spindle $a$ and is formed in the latter in the well-known manner, into the bearing and the cup $e$ of the same at a slow speed resulting from the difference in the revolution of the oil in the reservoir and of the helical groove in the spindle, the oil returning from the cup through the groove $f$ to the reservoir $d$ in order to be lifted again.

The impurities separate from the oil and are driven by centrifugal action against the outer wall or sides of the reservoir, where they are no longer subjected to the conveying action of the helical groove.

What we claim as our invention, and desire to secure by Letters Patent, is—

In apparatus of the character described, the combination of a spindle having a helical conveying-groove ascending in the direction of rotation of said spindle, a bearing provided with an oil-return passage, an oil-cup formed at the top of this bearing, and an oil-reservoir secured to said spindle below such bearing, substantially as and for the purpose herein set forth.

In testimony whereof we have signed our names to this specification in the presence of two subscribing witnesses.

M. AN HAACK.
    ALBERT KNOBLAUCH.

Witnesses:
    CYRYL TRESTNICKI,
    ALEKSANDER TREDEBOKE.